Patented Dec. 5, 1950

2,533,118

UNITED STATES PATENT OFFICE 2,533,118

SODIUM SILICATE CEMENT COMPOSITION

Harry J. Kahn, Matawan, N. J.

No Drawing. Application August 12, 1947,
Serial No. 768,269

2 Claims. (Cl. 106—82)

This invention relates to a new composition of matter for use as a cement or as a filler in objects made of ceramic materials, fired or unfired, such as tile, china, pottery, porcelain, stoneware, brick, glass, enamel iron, cement, stone, and in metal, wood, plaster, felt, marble, paper products. The cement is formulated for use at ordinary temperatures as well as at high temperatures up to 2200° Fahrenheit.

Among the objects of this invention is the preparation of a composition for the aforesaid purposes which may be readily applied to the surfaces to be cemented and which sets to rock hardness at ordinary temperatures in several hours to a day. At high temperatures the cement fluxes with the surfaces of the materials to cause strong adhesion.

Other, further and more specific objects of this invention will become readily apparent to persons skilled in the art or trade from a consideration of the following description:

A specific embodiment of my invention is illustrated by the following formula:

| | Pounds |
|---|---|
| Whiting | 50 |
| Steatite | 50 |
| Liquid silicate of soda | 180 |
| Lard oil | 5 |
| Aluminum stearate | 3 |

A preferred process for compounding the above formula consists in the addition of the lard oil to the silicate of soda, which results in a milky white liquid. The aluminum stearate is then added, forming a slightly thicker liquid. To this thick liquid are then added the powdery materials, that is, the whiting and steatite, forming a water slurry having a consistency varying from heavy molasses to a thick paste, depending upon the ratio of the powdery materials to the silicate of soda solution. The whiting and steatite may be added in either order or, if desired, may be previously thoroughly mixed before their addition to the other ingredients.

The resulting composition is then put into suitable tubes, containers, or cans that are then sealed and rendered air-tight. Until exposed to the air, this cement will not set and will retain its consistency.

The liquid silicate of soda found satisfactory for my invention is that which contains from 60 to 65% water. Instead of the liquid silicate of soda, an equal amount of powdered silicate of soda and water to yield the desired corresponding liquid may be employed.

The steatite serves to give the cement a smoother, fluffier and more deflocculated consistency. In lieu thereof, I may employ talc, French chalk, soapstone or magnesium silicate. The lard oil acts as a deflocculent and to maintain the solids in susepnsion longer.

The aluminum stearate serves as a water-repellent and renders the cement less susceptible to the action of water. Other metallic stearates may be used in lieu of aluminum stearate.

Instead of equal parts by weight of whiting and steatite, the relative quantity of each of these ingredients may be varied; i. e., for each total weight of 100 lbs. of both of these materials, the quantity of either of these materials may range from 35 to 65 lbs. Also, for each 100 lbs combined weight of whiting and steatite, the total combined weight of the liquid silicate of soda, lard oil and aluminum stearate may vary from 140 to 210 lbs.; the lard oil variation being from 2.5 to 7.5 lbs., the aluminum stearate from 1 to 4.5 lbs. and the liquid silicate of soda from 130 to 200 lbs.

My new composition is a cement of exceptional strength and forms an extraordinary bond between the surfaces joined thereby. My novel cement is easily applied and can be used to mend fractured articles. Ordinarily, it is unnecessary to give the surfaces to be joined a prime coat of cement, because any pores in the surfaces are sealed by this composition during the cementing.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A cement composition having a consistency from that of heavy molasses to a thick paste and comprising whiting, steatite, water solution of sodium silicate, lard oil and aluminum stearate, wherein the whiting constitutes 35 to 65 percent of the combined weight of whiting and steatite and, for each 100 pounds combined weight of whiting and steatite, the lard oil is 2.5 to 7.5 pounds, the aluminum stearate is 1 to 4.5 pounds and the sodium silicate solution is 130 to 200 pounds and has a concentration of 40 percent by weight of sodium silicate.

2. A cement composition having a consistency from that of heavy molasses to a thick paste and comprising whiting, steatite, water solution of sodium silicate, lard oil and aluminum stearate, substantially in the proportions of 50 pounds whiting, 50 pounds steatite, 180 pounds of water solution of sodium silicate having a concentration of 40 percent by weight of sodium silicate, 5 pounds lard oil and 3 pounds aluminum stearate.

HARRY J. KAHN.

REFERENCES CITED

The following references are of record in the file of this patent:

UNITED STATES PATENTS

| Number | Name | Date |
|---|---|---|
| 607,292 | Stocker | July 12, 1898 |
| 780,001 | Hall | Jan. 10, 1905 |
| 1,110,808 | Basile | Sept. 15, 1914 |
| 1,668,768 | Hortung | May 8, 1928 |
| 2,311,272 | Ware | Feb. 16, 1943 |
| 2,315,713 | Johnson | Apr. 6, 1943 |
| 2,376,163 | Metzger | May 15, 1945 |

FOREIGN PATENTS

| Number | Country | Date |
|---|---|---|
| 473,516 | Great Britain | 1937 |